Aug. 2, 1949.  B. DIAMOND  2,477,967
VARIABLE SPEED FLUID TRANSMISSION AND DIFFERENTIAL
Filed Dec. 27, 1945
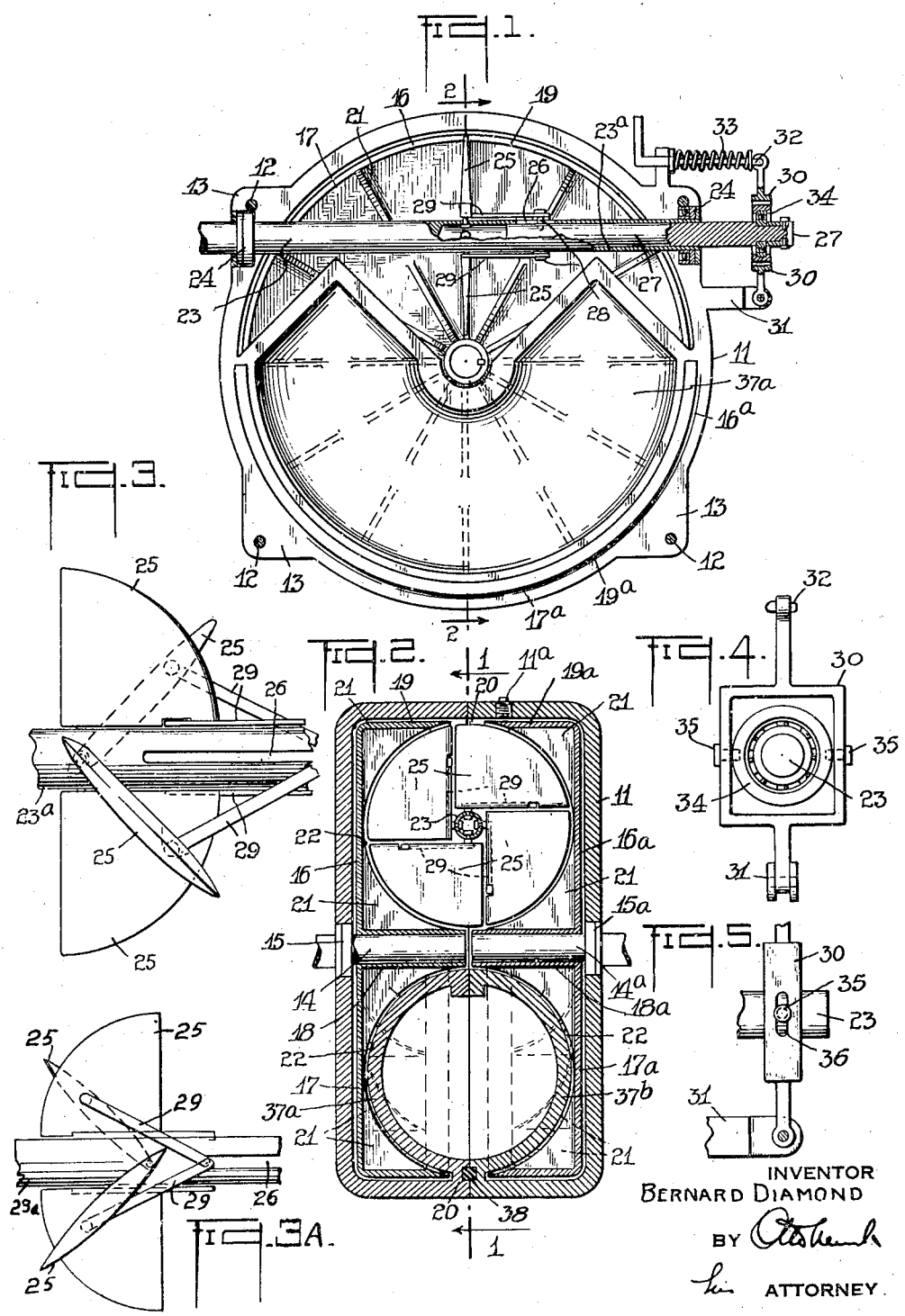
INVENTOR
BERNARD DIAMOND
BY
ATTORNEY Patented Aug. 2, 1949

2,477,967

UNITED STATES PATENT OFFICE 2,477,967

VARIABLE-SPEED FLUID TRANSMISSION AND DIFFERENTIAL

Bernard Diamond, Brooklyn, N. Y.

Application December 27, 1945, Serial No. 637,333

12 Claims. (Cl. 60—54)

The present invention relates to a fluid transmission and differential.

One object of the invention is to provide a fluid transmission which is variable in its transmission ratio and reversible.

Another object of the invention is to provide a variable and reversible fluid transmission in which a variable fluid impelling unit is disposed in the rotor housing for rotation about an axis at right angles to and spaced from the rotor axis.

A further object of the invention is to provide a variable and reversible fluid transmission including two coaxial rotors and an impeller disposed eccentrically between the rotors.

Still another object of the invention is to provide a fluid transmission which also operates as a differential and which has all its moving parts enclosed in a single compact housing.

A still further object of the invention is to provide a unitary installation which will combine the functions of the power transmission gear and of the differential, for instance in a motor car, and which will provide smooth cushioned motion at acceleration.

These and other objects, which will appear more clearly as the specification proceeds, are accomplished, according to the present invention, by the arrangement and combination of elements set forth in the following detailed description, defined in the appended claims and illustratively exemplified in the accompanying drawing in which:

Fig. 1 is a section of a device according to the invention, taken at right angles to the rotor axis on line 1—1 of Fig. 2, with parts of the drive shaft mechanism shown in elevation, Fig. 2 is a sectional view, taken on line 2—2 of Fig. 1, Fig. 3 is a diagrammatic side view on a somewhat larger scale of the drive shaft with the propeller blades adjusted to a maximum transmission ratio, Fig. 3a is a view similar to that of Fig. 3, except that the blades are illustrated in the position reverse to that of Fig. 3, Fig. 4 is a larger scale end view, seen from the right hand side in Fig. 1, of the suspension for the propeller control rod, and Fig. 5 is a partial side view of this suspension.

Referring now to the drawings and first to Figs. 1 and 2, 11 is a substantially cylindrical two-part housing, the two parts being secured together by means of bolts (not shown) passing through holes 12 in ears 13. An oil inlet port 11a is normally closed by a plug. Two axles 14, 14a, project through sealed bearings 15, 15a in the opposite end walls, respectively, of the housing 11 to constitute the driven shafts of the transmission. Two rotors, 16, 16a are mounted inside of the housing 11 on the two axles 14, 14a, respectively, in coaxial and adjacent relationship. Each rotor, 16, 16a, comprises an annular disc 17, 17a disposed adjacent the corresponding end wall of the housing 11, an inner cylindrical flange 18, 18a surrounding the corresponding axle 14, 14a, respectively, and secured thereto, and an outer cylindrical flange 19, 19a, the free edges of the flanges 19, 19a being spaced apart a predetermined distance to define therebetween an annular slot 20.

Each rotor is provided with a plurality of fixed radial vanes 21, said vanes being cut out to provide between the two rotors 16, 16a an annular space 22 of substantially circular cross-section connected by the slot 20 to the outer peripheral plane of the rotors. In the embodiment shown, the cut out vanes 21 take the form of triangular plates disposed in planes radial to the rotor axis, each plate having two straight sides joined to the inner surfaces of the annular disc and of one of the cylindrical flanges of a rotor and a free side curved on the arc of a circle.

A drive shaft 23 projects into the housing 11 with its axis extending in the plane separating the two rotors 16 and 16a and at a distance from the rotor axis equal to about one half the rotor radius. Thus, the shaft 23 passes through the slot 20 and its axis intersects a circular cross-section of the annular space 22 centrally and at right angles.

The shaft 23 is rotatably supported in sealed bearings 24 set in the end walls of the housing 11. Four impeller blades 25 are pivoted to the drive shaft 23 in the plane in which said shaft intersects one of the cross-sections of the annular space 22 at right angles. Each blade 25 has a substantially triangular shape with a longer and a shorter straight side joining each other on a right angle and a curved side connecting the ends of said straight sides along the arc of a circle slightly smaller than the circle corresponding to the cross-section of the annular space 22. Each blade is pivoted to the shaft on an axis at right angles to the latter and passing into the plane of the blade at right angles to the longer straight side thereof a short distance from the right angled corner. The four blades are distributed around the drive shaft in such a manner, that in their feathering position, shown in Figs. 1 and 2, in which they are disposed in a common plane at right angles to the drive shaft 23, they occupy a cross-section of the annular space 22.

The pitch of the blades can be varied or reversed by means of the following arrangement: The end portion 23a of the shaft 23 is tubular and provided at 90° intervals with four longitudinal slots 26. A control rod 27 projects from the outside of the housing 11 into the tubular part 23a of the shaft 23 and is rotatable with the shaft 23, but axially slidable therein. Pins 28 project radially outwardly from the rod 27 through the slots 26, and links 29 have each one end thereof pivoted to the outer end of one of the pins 28 and the opposite end pivoted to the longer straight side of one of the blades 25 at a point spaced from the pivot point of the blade, each link 29 being movable in a plane substantially tangential to the shaft 23. A rectangular frame 30 is pivoted with a downward extension to a bracket 31 projecting from the housing 11 below the point where the rod 27 emerges from one of the bearings 24, whereas an upper extension of the frame 30 is hingedly connected with the end of a control cable 32 urged in one direction by means of a spring 33. A ball bearing 34 is mounted by means of two laterally projecting pins 35 in slots 36 in the vertical arms of the frame 30 and embraces the outer end of rod 27, so as to transmit displacements of the frame 30 along the axis of the rod 27 to the latter. The blades 25 can thus be adjusted simultaneously to corresponding positions in which they extend in planes inclined relative to the axis of the drive shaft in one or the other direction.

The part of the annular space 22 which is not required for the revolution of the impeller blades 25 in any of their adjusted positions is, preferably, substantially filled by an arcuate closed tubular element 37 having the cross-section of a circle slightly smaller than that corresponding to the cross-section of the space 22. The tubular element 37 may extend through an angle of about 240° and, in the example shown, it is composed of two half-tubular shells 37a, 37b, which are formed integral with the two halves, respectively, of the casing 11. A part annular gasket 38 fitted into arcuate corresponding grooves along the peripheries of the two half-shells 37a, 37b acts as an oil seal.

The presence of the tubular element 37 prevents the pressure fluid, when impelled by the impeller blades 25 in one or the other direction from circulating freely through the annular space 22 and, thus, the revolving fluid is forced against the rotor vanes 21 thereby causing revolution of the rotors in the desired direction.

The device operates as follows:

The housing is filled with a hydraulic fluid, such as oil, through the inlet port 11a which is then closed by means of a plug. Rotation of the drive shaft 23 will force the oil to circulate along the tubular element 37 and to impinge against the rotor vanes 21 in dependence upon the pitch position of the impeller blades 25. When the blades are in their feathering position, shown in Figs. 1 and 2, no power will be transmitted from the drive shaft 23 to the driven rotors and their shafts 15, 15a. When the blades 25 are adjusted to the position shown in Fig. 3, the ratio of transmission is maximum in one direction. Swinging out of the blades 25 in the direction opposite to that shown in Fig. 3 beyond the feathering position reverses the direction of the drive. Each driven shaft 15, 15a will be retarded or accelerated in accordance with the load (such as frictional load) operating thereon independently from the other driven shaft. It is obvious that the number of the impeller units could be multiplied within the annular space 22, with a corresponding reduction in the length of the tubular element 37 which may also be subdivided into sections to provide space for the operation of additional impeller units.

I claim:

1. A fluid power transmission, comprising a closed cylindrical housing, a rotor disposed coaxially in said housing and having vanes formed with a curved profile to leave a coaxial annular channel extending to the peripheral plane of the rotor in said housing, a drive shaft projecting at right angles to the axis of said rotor and at a distance from said axis into said housing and channel, an impeller blade mounted on said drive shaft in a plane containing the rotor axis and intersecting the axis of the drive shaft at right angles, and means operable from the outside of the housing to change the pitch of said impeller blade.

2. A fluid power transmission, comprising a closed cylindrical housing, a pair of rotors disposed coaxially in said housing and having vanes formed with a curved profile to leave between said rotors a coaxial annular space open at the peripheral plane of the rotors, a drive shaft projecting at right angles to the cylinder axis and at a distance therefrom into said housing and the space between said rotors, an impeller blade mounted on said drive shaft in a plane containing the cylinder axis and intersecting the axis of the drive shaft at right angles, and means operable from the outside of the housing to vary the pitch of said impeller blade.

3. A fluid power transmission and differential, comprising a closed cylinder housing, a pair of rotors disposed coaxially in said housing adjacent each other and having fixed vanes cut out to leave between said rotors an annular space of circular cross-section and an annular slot extending from said annular space to the outer peripheral plane of the rotors, a drive shaft projecting from the outside into said housing and said annular space through said annular slot on a chord which passes through the center of a cross-section of said annular space at right angles to the plane of said cross-section, at least one impeller blade secured to said shaft in said plane for rotation in said annular space, and means operable from the outside of the housing to vary the pitch of said impeller blade.

4. A fluid power transmission and differential as claimed in claim 3, in which the diameter of a circle formed by any cross-section of said annular space is approximately equal to the radial length of the rotor vanes, and the point where the axis of the drive shaft passes at right angles through a cross-section of said annular space is approximately equi-distant from the rotor axis and the rotor periphery.

5. A fluid power transmission and differential as claimed in claim 3, in which said rotor vanes are disposed in radial planes containing the rotor axis.

6. A fluid power transmission and differential as claimed in claim 3, including a plurality of impeller blades, each pivotally mounted on said drive shaft for swinging movements about an axis at right angles to the shaft.

7. A fluid transmission and differential, as claimed in claim 3, including a stationary arcuate element having the cross-section of a circle slightly smaller than that corresponding to the cross-section of said annular space and substantially filling the part of the latter not required for the operation of the impeller blade in any pitch position thereof.

8. A fluid transmission and differential, as claimed in claim 3, including a hollow tubular arcuate element closed at its ends and having the cross-section of a circle slightly smaller than that corresponding to the cross-section of said annular space, said arcuate element being disposed in and substantially filling the part of said annular space not required for the operation of the impeller blade in any pitch position thereof, and means extending through said annular slot to connect said arcuate element with said casing.

9. A fluid transmission and differential, as claimed in claim 3, including a stationary arcuate element having a cross-section of a circle slightly smaller than that corresponding to the cross-section of said annular space, said arcuate element being disposed in said annular space and substantially filling a part thereof extending through about 240° with about 60° of the annular space on each side of said plane in which said impeller blade is secured to said drive shaft being left free to permit operation of the impeller blade in any pitch position thereof.

10. A fluid power transmission and differential as claimed in claim 3, including four impeller blades each having a longer and a shorter straight side joining each other on a right angle, and a curved side connecting the free ends of said straight sides along an arc of a circle slightly smaller than the circle corresponding to the cross-section of said annular space, each blade being pivoted to said drive shaft on an axis at right angles to the latter and passing into the plane of the blade at right angles to the long straight side thereof a short distance from the right angled corner.

11. A fluid power transmission and differential as claimed in claim 3, including a plurality of impeller blades pivotally mounted on said drive shaft which latter includes a tubular portion, said pitch varying means including for each impeller blade a link having one end thereof pivoted to a point of the associate blade remote from its pivot point and its other end slidably secured in a longitudinal slot provided in said tubular portion of said drive shaft, each link being disposed and movable in a plane substantially tangential to the drive shaft, a control rod passing from the outside into said tubular portion of the drive shaft and including means for shifting said other ends of said links in axial direction without interfering with the rotation of the drive shaft to change the pitch of the impeller blades, and means for adjusting the position of said rod relative to said drive shaft.

12. A fluid power transmission and differential as claimed in claim 3, in which each rotor includes an axle passing through the wall of the housing, an annular disc on said axle adjacent one interior wall of the housing, an inner cylindrical flange surrounding the associated axle and fixed thereto, an outer cylindrical flange adjacent the peripheral wall of the housing, the two outer cylindrical flanges of the two rotors having their free edges spaced apart to permit passage of the drive shaft therebetween, and vanes in the form of substantially triangular plates having their free edges curved along arcs of a circle, said plates being disposed in radial planes relative to the rotor in the corners formed by the annular disc and the cylindrical flanges of each rotor.

BERNARD DIAMOND.

REFERENCES CITED

The following references are of record in the file of this patent:

UNITED STATES PATENTS

| Number | Name | Date |
|---|---|---|
| 1,175,605 | Cloos | Mar. 14, 1916 |
| 1,304,566 | Hornbrook | May 27, 1919 |
| 2,034,302 | Kohler | Mar. 17, 1936 |

FOREIGN PATENTS

| Number | Country | Date |
|---|---|---|
| 26,908 | Great Britain | Dec. 5, 1907 |
| 500,610 | France | Dec. 27, 1919 |